Oct. 19, 1926.
A. H. PITNEY
1,603,402
POSTAGE METER DEVICE
Filed Dec. 12, 1922     3 Sheets-Sheet 1
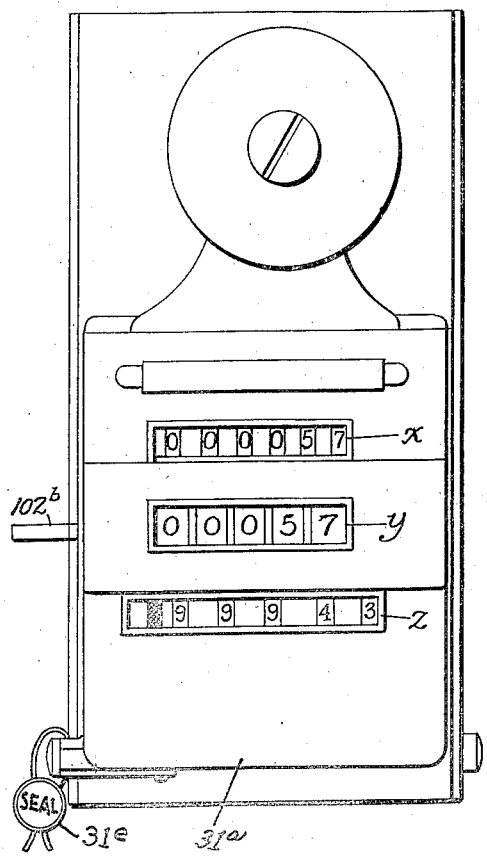
Fig.1.
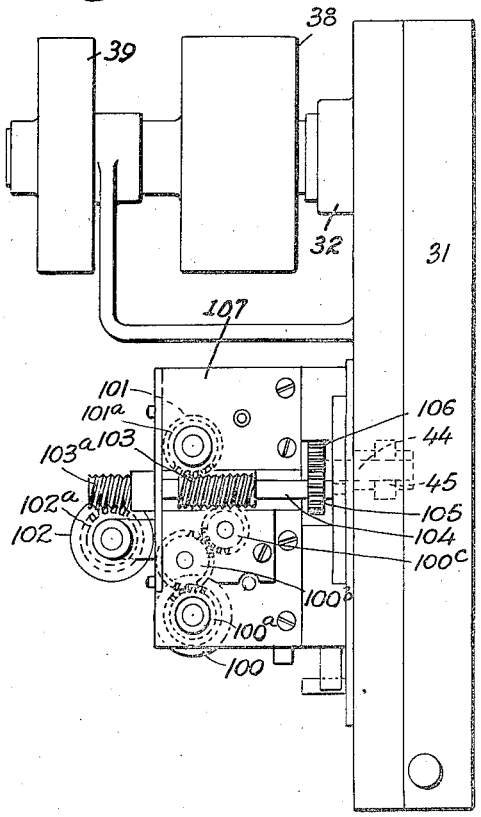
Fig.2.
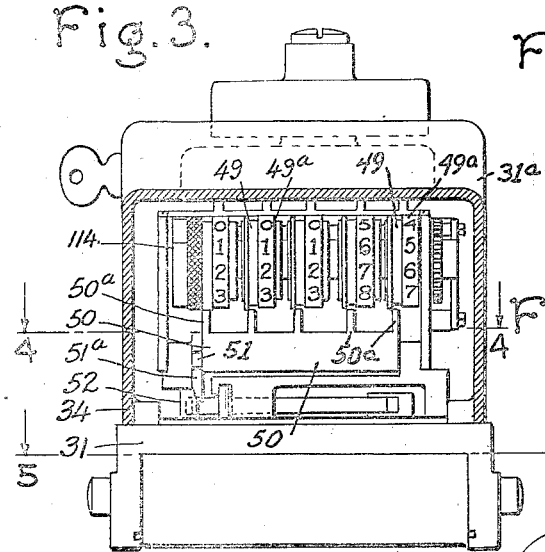
Fig.3.
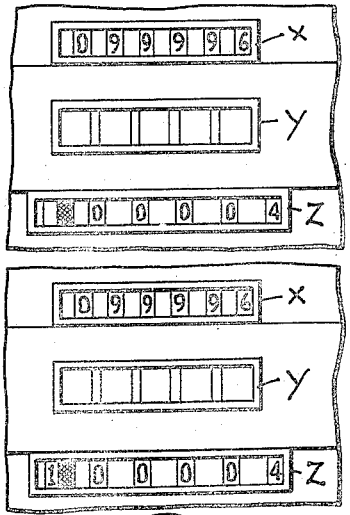
Fig.10.
Fig.11.
INVENTOR:
Arthur H. Pitney
BY
Alexander Powell
ATTORNEYS.

Oct. 19, 1926.
A. H. PITNEY
POSTAGE METER DEVICE
Filed Dec. 12, 1922    3 Sheets-Sheet 2
1,603,402
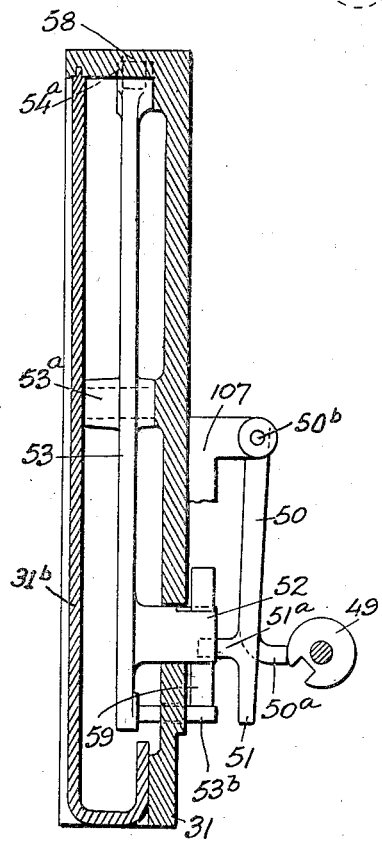
Fig. 6.
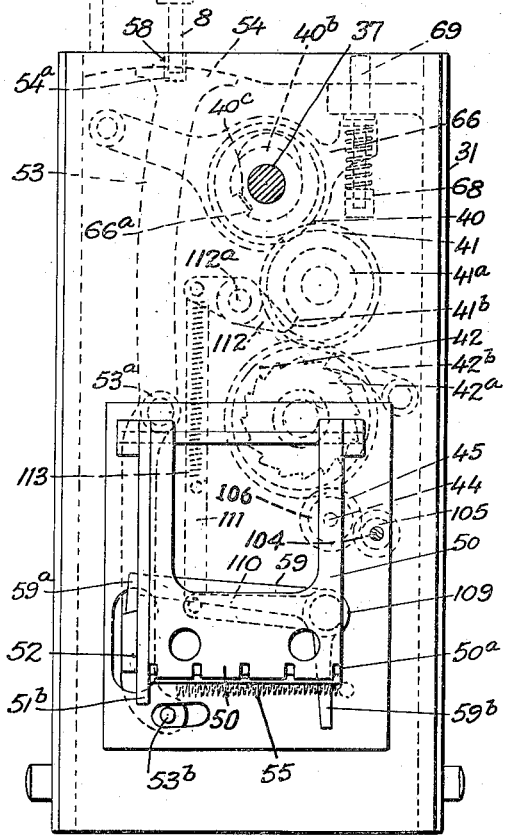
Fig. 4.
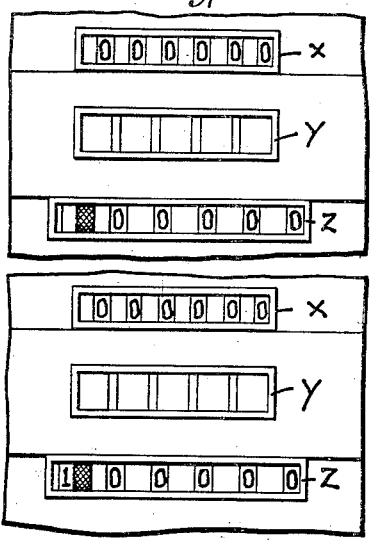
Fig. 7.
Fig. 8.
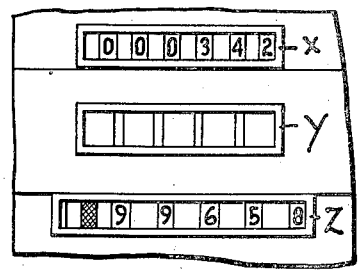
Fig. 9.
INVENTOR.
Arthur N. Pitney
BY
Alexander Dowell
ATTORNEYS

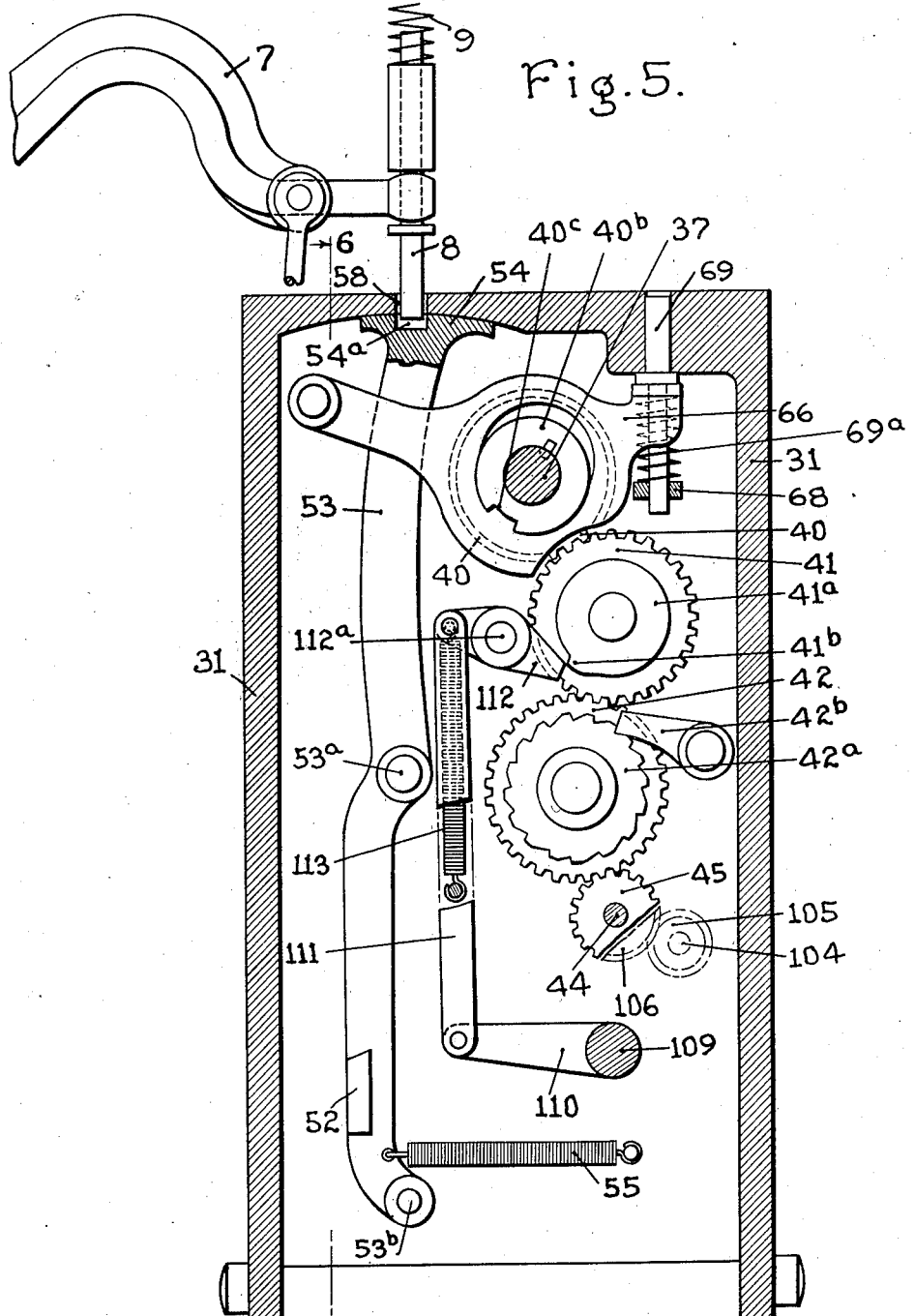

Patented Oct. 19, 1926.

1,603,402

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

POSTAGE-METER DEVICE.

Application filed December 12, 1922. Serial No. 606,427.

This invention is an improved meter or means for registering the number of operations of machines of the type shown in my Patents #1,273,793, dated July 23, 1918, (Reissue #14,916 dated July 13, 1920) and #1,370,668, dated March 8, 1921.

Such machines are principally used by parties having a large number of letters to mail, and enables them to buy any desired amount of prepaid postage from the Government, and use such postage from time to time as they desire, until the amount of postage for which they paid is exhausted, whereupon the machine and meter will be automatically rendered ineffective, so that no further prepaid postage can be printed by the machine until and unless a further amount of prepaid postage is first purchased and the meter reset by the proper officials.

The present invention provides a simple novel detachable meter having an ascending counter, a descending counter, and a third or "set back" counter which will show how many stamps have been applied by the machine (or how many operations have been performed by the machine) to which the meter is applied since the last preceding official setting of the meter without the necessity for mathematically ascertaining the sum of the difference between the amounts indicated on the ascending and descending counters. The present invention is an improvement upon the meters shown in my aforesaid patents, and in my application (Case #6754) filed July 12, 1922, Serial No. 574,427.

The printing mechanism or machine with which the meter can be used may be various types, providing such machine is equipped with the proper driving connections; and also preferably with a reciprocable member or pin adapted to be projected into the meter casing at the beginning of each operation of the machine and to be withdrawn at the completion of such operation such as shown and described in my Patent #1,370,668. Also preferably the printing mechanism is so constructed that it will not function, if for any reason, the said meter pin is prevented from projecting into the meter at each operation of the printer.

I will explain the invention with reference to the accompanying drawings which illustrate one practical embodiment thereof; and as the invention is capable of various changes in form, construction and combinations of parts I have set forth in the claims the essentials of the invention and the novel features of construction and novel combinations of parts for all of which protection is desired.

In the drawings I have shown only such parts of a machine (such as shown in my aforesaid patents) with which the meter is employed, as are necessary to an understanding of its use therewith.

In the said drawings:

Fig. 1 is a plan view of the meter.

Fig. 2 is a side elevation thereof, the casing enclosing the registering mechanism being removed.

Fig. 3 is an end view of Fig. 1 with the front end of the casing broken away.

Fig. 4 is a longitudinal sectional view on line 4—4 Fig. 3, various parts being broken away.

Fig. 5 is a longitudinal section on the line 5—5 Fig. 3, showing the gearing.

Fig. 6 is a longitudinal detail section on the line 6—6 Fig. 5.

Figs. 7 to 11 inclusive are diagrams illustrating various relative positions of the numeral wheels of the ascending and descending register.

As shown in the accompanying drawings the meter comprises a hollow base member 31 upon which is mounted a casing 31$^a$ enclosing the counting or registering mechanism. The base 31 is preferably formed of a casting approximately rectangular and closed at top and each end but open at bottom; the bottom however being preferably closed after the parts are assembled by a slidable plate 31$^b$, as described in my aforesaid application, so that if the plate is once put in place it cannot be removed.

The casing 31$^a$ may also be of cast metal and closed at top, sides and ends, and is preferably secured to the base by screws which are inaccessible when plate 31$^b$ is in place, as described in my said application, so that access cannot be had to the interior of the casing except through a door in one end thereof, and is secured when closed, by a suitable lock 31ᶜ so that unauthorized access to the interior of the casing or meddling with the mechanism are prevented; and unauthorized access may be further prevented by an ordinary seal 31ᵉ as indicated in Fig. 1, which would have to be broken off before a key could be inserted in the lock.

Mounted on the base 31 adjacent one end thereof is a bracket 32 in which is journaled a spindle 37 carrying a printer 38 and a roller 39. The spindle 37 extends through the base 31 and is provided on its lower end with devices (not shown) preferably such as described in my Patent #1,370,668, whereby it will be operatively engaged with the mechanism of the machine to which the meter is applied when the meter is properly positioned in such machine. Therefore when the meter is in place in such machine each time a piece of mail matter properly passes through the machine the spindle carrying the printer will be rotated once; provided the amount of prepaid postage for which the meter was set has not been exhausted, and that the other safety or cautionary devices such as referred to in my aforesaid patent permit the operation of the machine.

Assuming that the parts are all in proper operative condition and the amount of prepaid postage for which the meter was set has not been exhausted when the meter is in position on the machine each time that a piece of mail passes through the machine it receives an impression from the printer 38 as explained in my aforesaid patent; and each operation is registered by the counters in the meter, as hereinafter explained.

Within the casing 31ᵃ is a frame 107 carrying the registering or counting mechanism, which, in the construction illustrated, comprises three counters or registers 100; 101; 102; preferably arranged as indicated in Figs. 1 and 2. The counter 100 is the "subtracting" or "descending" counter; the counter 101 the "adding" or "ascending" counter; and the counter 102 I call the "set back" counter, as it indicates the number of effective operations performed by the machine to which the meter is applied, or the sum of the difference between the amounts displayed on the adding and subtracting counters, subsequent to the last preceding official "setting" of the meter.

Each of the counters 100, 101 and 102 is preferably of the geared type, the motion of the unit wheel thereon being transmitted to the others in turn by Geneva stop gears; such counters are well known and need no detailed explanation herein.

In each counter the motion of one numeral wheel is communicated to the next numeral wheel of higher denomination by suitable means; the unit wheel is the prime mover of the series. None of the wheels can be turned independently, but each is moved in regular order of progression by means of its geared connection with the unit wheel, preferably as described in my aforesaid patent application.

The units wheels of the several counters may be properly driven as follows: A spindle 104 is suitably journaled in the frame 107, in which the counters are mounted, and is geared as hereinafter described, to the printer spindle 37. The spindle 104 (see Figs. 2 and 4) extends at right angles to and between the shafts 101 and 102, and it has a worm gear 103ᵃ on one end which meshes with a worm gear 102ᵃ connected with the units disk of the counter 102; and it also has a worm 103 which meshes with a worm gear 101ᵃ of the units disk of the counter 101. Worm 103 also meshes with a worm gear 100ᶜ journaled on a stud in the frame 107, and gear 100ᶜ meshes with an intermediate gear 100ᵇ which in turn meshes with gear 100ᵃ on the units disk of the counter 100, as indicated in Fig. 2. The spindle 104 is driven from the spindle 37 carrying the printer 38 by the following devices. As shown (Figs. 2 and 5) a pinion 105 on spindle 104 meshes with a gear 106 on a stub shaft 44, journaled in the base 31; and on shaft 44 is a pinion 45 which meshes with an intermediate gear 42 journaled on a stud in the base, and gear 42 meshes with a gear 41 journaled on a stud in the base, said gear 41 in turn meshing with a gear 40 keyed to the spindle 37 carrying the printer or die 38 (see Figs. 2 and 5).

The gears 40, 45, 106, 105, and worms 103 and 103ᵃ, and the counter gears 100ᵃ, 101ᵃ, and 102ᵃ, are so proportioned that each one of the counters is caused to register one unit for each complete revolution of the die spindle.

As stated, the meter illustrated is designed for use in connection with machines like that shown in my Patent #1,370,668, and when placed in such machine the spindle 37 will be operated once for each effective operation of the machine, as described in said patent. The operation of the machine is controlled by the passage of the matter to be operated on, as described in said patent.

Each numeral wheel 49ᵃ of the subtracting counter 100 has a disk 49, see Fig. 6, fastened to and revolving therewith; each disk 49 has a single peripheral notch therein and is so positioned that the notch will be in position to receive a projection 50ᵃ on a locking plate 50 when "zero" in the related numeral wheel 49ᵃ appears opposite the sight aperture in casing 31ᵃ.

A locking plate 50 is pivoted at 50ᵇ, Fig. 6, below the counters. This plate 50 has projections 50ᵃ (see Figs. 3 and 6) on its front end adapted to engage the notches in the disks 49. Said locking plate 50 is adapted to operate substantially like the locking plate 30 described in my Patent #1,382,224 (Case #6474) dated June 21, 1921, or the locking plate 14 described in my application #574,427 (Case #6754), above referred to.

As shown, this locking plate 50 has at its left hand side a handle 51 which projects beyond the front end of the plate and by which the plate can be moved in charging the meter. Plate 50 also has a downwardly projecting lug 51ᵃ for a purpose hereinafter explained.

A lever 53 (Figs. 4 and 5) is pivoted at 53ᵃ in the base 31, so as to oscillate horizontally, and this lever has near its forward end an upwardly projecting lug 52 which passes through a hole in the top of the base 31 and projects above the same, as indicated in Fig. 3, and is adapted to be engaged with the lug 51ᵃ as indicated in Figs. 3 and 4, when the parts are in normal operative positions. On the extreme forward end of lever 53 is an upwardly projecting pin 53ᵇ which also passes through a hole in the top of base 31 in front of the counter frame 107, and serves as a handle whereby lever 53 can be moved in setting the meter.

On the inner end of lever 53 is a segmental head 54 (Figs. 4 and 5) which is provided with a socket 54ᵃ adapted to register with a hole 58 when locking plate 50 is disengaged from the notches in the disks 49 as in Fig. 3, but head 54 will close an opening 58 in the inner end of base 31, when the locking plate 50 has locked the registering wheels 49ᵃ of counter 100. The lever 53 is engaged by a spring 55 which tends to move the lever into position to cause the head 54 to move socket 54ᵃ out of register with the hole 58.

The lug 52 of the lever 53 projecting upward into the space between 107 and 31 normally engages the lug 51ᵃ which prevents spring 55 moving lever 53, and keeps the socket 54ᵃ in alignment with the hole 58.

When lever 53 is in normal position (Fig. 5) the meter pin 8 may enter the socket 54ᵃ, and the machine will function, allowing the die to revolve, and the meter thus operated (as explained in my Patent #1,370,668 above mentioned). But when the counter 100 has registered an amount which permits all the projections 50ᵃ on locking plate 50 to enter the notches in disks 49, the lug 51ᵃ is withdrawn out of the path of lug 52, and the spring 55 then swings lever 53 and moves socket 54ᵃ out of alignment with hole 58 so that the meter pin 8 cannot enter socket 54ᵃ, and the die cannot be operated, as explained in said patent.

Below the counters and above base 31 is a lever 59 (Fig. 4) which is secured to a rock shaft 109, mounted in the base 31, and on this shaft within the base is a lever 110 (Fig. 5) which is connected by a link 111 to a stop lever 112, pivoted at 112ᵃ within the base 31, adjacent gear 41. To gear 41 is attached a disk 41ᵃ having a projecting lug 41ᵇ which is adapted to be engaged by the stop arm 112 and lock the gears (see Fig. 5). Stop lever 112 is provided with a spring 113 which normally tends to swing it into position to engage the lug 41ᵇ. As gear 41 has the same number of teeth as gear 40 on the die spindle 37, when lug 41ᵇ engages stop 112 the die spindle will be stopped and it will be stopped in the same position each time lever 112 engages lug 41ᵇ.

The spring 113, by reason of the connection link 111, the lever 110 and spindle 109, tends to swing the lever 59 in a forward direction. The free end of lever 59 has a forwardly projecting lug 59ᵃ which is normally held in engagement with the rear edge of the lug 52 of the lever 53, under the influence of the spring 113, and when so engaged will hold the latch lever 112 out of position to engage lug 41ᵇ.

A forwardly projecting arm 59ᵇ (which may be of one piece with lever 59) is attached to shaft 109 (Fig. 4) and serves as a handle by which the lever 59 can be moved in charging the meter.

By means of the devices 59, 109, 110, 111, and 112, the gear train will be positively locked whenever the locking plate 50 rises and locks the counter 100, thus relieving the counter from all strain in the locking operation; and the shutter lever 53 will be securely held in locked position by the part 59ᵃ engaging part 52 until the meter has been opened and the parts properly reset.

To prevent any backward motion of the parts a ratchet wheel 42ᵃ is secured to the intermediate gear 42 and is engaged by a pawl 42ᵇ. (See Fig. 5.)

The spindle may be also further locked by means of a catch lever 66 provided with a tooth adapted to engage a notch 40ᶜ in a disk 40ᵇ secured to the spindle 37. This latch 66 being automatically engaged with the notch 40ᶜ when the meter is removed from the machine by the action of a spring 69ᵃ on a pin 69 which projects into an opening in the casing in the base 31 and the catch is automatically disengaged from the spindle when the meter is positioned in the machine, as explained in my Patent #1,370,-668.

A knurled ring shield 114 (Fig. 3) is mounted on an extension of the left hand numeral wheel of counter 100. Said ring shield has been fully described in my aforesaid application (see part 55, Case #6754) and need not be described herein, except to generally state that it is designed to shield or cover up the notch in the disk 49 of the related numeral wheel at the time of charging the meter so that the locking plate 50 will be held in its downward or disengaged position long enough to allow the numeral wheels to be turned to positions where the notches therein will not register with the lugs 50ª on the locking plate, the shield 114 being moved to uncover the notch at the first next succeeding operation of the counter.

My improved meter in common with the meter shown in Patent #1,370,668 (Case #6424) and application #574,427 (Case #6754) has an ascending and a descending counter, and in addition, a third counter capable of being reset, or "set back" to zero at the beginning of each run of mail, or series of operations of the machine said "set back" counter not only providing an automatic count for each particular batch of mail sent out, but also serving as a quick check for the amount of mail used, since the beginning of the last series of operations.

This "set back" counter is preferably located between the counters 100 and 101, and its figures thereon are visible through an opening $y$ in the top of the housing 31ª (see Fig. 1). The counter nearest the die is the ascending counter (visible through opening $x$). The ascending counter does not have to be reset and for that reason is not accessible. The counter adjacent the door is the descending counter (visible through opening $z$) and is accessible for resetting when postage is purchased.

When the meter leaves the factory all the numerals on both the ascending and descending counters should read zero (see Fig. 7). On a meter having five wheels in the descending counter, the maximum capacity would be 99,999 impressions, but by reason of the fact that the knurled sleeve, at the left of the last wheel, has an opening on one side at a point properly positioned, with respect to the part that serves as a "rest" for the longest tooth of the locking comb, the movement necessary brings the opening immediately over the figure 1 engraved on the hub or extension of the last numbering wheel with the result that while the other wheels are left at zero the addition of the figure 1 within the opening makes the counter read 100,000 as shown in Fig. 8.

The ascending register is not touched and still reads zero.

When the first impression is registered, the entire set of numbering wheels of the descending counter turns over one space, bringing into view the figure 9 on each wheel. The numeral 1, on the hub or extension of the last wheel 114 of the subtracting counter is also moved a corresponding distance, and is therefore no longer visible through the opening in the knurled sleeve.

Assuming that after the first setting 342 impressions are made before reading the meter, the descending counter would read 99658 and the ascending counter 000342 (see Fig. 9).

The two counters continue to register one unit for each operation until all of the figures on the descending counter read zero, by which time all of the teeth on the locking comb 51 will have entered their respective notches in the disks 49 attached to each numbering wheel 49ª of the descending counter (Fig. 3) and when this occurs plate 50 rises, releasing levers 59 and 53, and lever 53 closes the aperture for entering of the meter pin 8, and lever 59 permits catch 112 to lock the gears, such operations occurring automatically when a predetermined number of operations have been completed. The parts remaining locked, the machine cannot be further used efficiently (as described in my aforesaid patent) until the meter has been removed, sent to the post office and reset by the proper official for another amount of prepaid postage, and replaced in the machine.

The ascending counter is not affected by such removing and replacing, but will continue to accumulate until the total operations made by the printer has reached 999,999, when all the wheels again clear to zero, and start over again, thereby signifying that a total of 1,000,000 impressions have been used each time the ascending register clears to zero.

Without the knurled sleeve it would be impossible to recharge the meter until the full amount of prepaid postage and the last impressions thereof had been used. This would be impractical in business on account of the liability of the meter becoming discharged during the rush hours of the evening, necessitating a trip to the postoffice when time is precious, but with the knurled sleeve, it is possible for the clerk operating the machine to have the meter recharged whenever he notices the balance is getting small. This knurled sleeve therefore enables the clerk in the postoffice to accept payment for another batch of prepaid postage and set the meter accordingly, as indicated by the appearance of the numeral 1 on the opening provided for the purpose.

For instance, in Fig. 10 the descending counter shows that only four more impressions can be made, and the ascending register shows that 099,996 operations have been made, (the total equaling the original purchase of 100,000). Noting this fact, it is decided to buy another 100,000 of prepaid postage. The meter can be removed, and sent to the postoffice, the proper official breaks the seal, opens the door, depresses the locking plate and turns the knurled sleeve 114 forward so as to hold the long tooth of the locking plate 50 out of engagement with the notch in the adjacent numeral disk, then resets the descending counter to show the amount of postage bought, then locks and seals the meter. The two counters (100 and 101) then read as shown in Fig. 11 (099,996 and 100,004) indicating that another 100,000 prepaid postage is available before the meter will automatically lock.

The meter herein described has five wheels in the descending counter, and only the full capacity of the meter of this type can be purchased at a time (as would be the case when a geared counter is used, in which the wheels cannot be turned back by hand as can be done with the ratchet type) therefore the user of a meter of this capacity with geared counters would have to purchase postage in lots of 100,000.

For the smaller users, the descending geared counters may have only three or four numeral wheels in which case the user would have to buy his postage in lots of 10,000 (the figure 1 being placed on the hub of the 4th wheel). If the counter has only three wheels the user would only have to buy postage in lots of 1,000. This would not necessitate altering the design of the meter, as the extra space in the frame carrying the numbering wheels would merely be filled with a corresponding number of blank rings to take the place of the numbering wheels not used.

The mechanical operation of the specific mechanisms shown in the drawings is as follows:

When the meter is "charged" ready for use the locking plate 50 is held down by one or more of its lugs 50ª resting on the peripheries of disks 49, and the lug 51ª engages lug 52 of lever 53 and head 54 is held in position to register socket 54ª with hole 58. Lug 59ª of lever 59 is also stopped by the lug 52 on lever 53 and holds stop arm 112 clear of lug 41ᵇ on the gear 41.

When counter 100 reaches zero, all lugs 50ª enter notches in disks 49, and plate 50 raises under the influence of a suitable spring, carrying with it lug 51ª, whereupon lug 52 is released and lever 53 is then swung over by spring 55 and head 54 closes hole 58. The lug 59ª is also released by this movement of lever 53, and swings behind the lug 52 and effectually prevents lever 53 from being restored to position except by the proper official in recharging the meter. This swinging movement of lever 59 (acting through spindle 109, lever 110 and link 111) rocks stop lever 112 into the path of the lug 41ᵇ, and arm 112 locks the train of gears between the spindle 37 and the counter drive shaft 44; when the meter is removed from the machine latch 66 engages notch 40ᶜ and holds the spindle immovable until the meter is replaced in the machine.

To charge the meter the official breaks seal and unlocks and opens door. He then should first move lever arm 59ᵇ to left; this releases stop arm 112 and also removes lug 59ª from interfering with movement of lever 53. Second, move pin 53ᵇ to left, which shifts lever 53 so as to open the hole 58 in base 31. Lever 59ᵇ can then be released, as lug 59ª will then rest on lug 52 holding it in position. Third, draw down the locking bar 50 by means of projecting lug 50ᵇ; this pushes lug 51ª into the space below frame 107; hand pressure on the pin 53ᵇ can now be released as the lug 52 rests against lug 51ª; finally, turn the knurled ring 114 downward as far as it will go; this will cover the notch in disk 49 of the left hand figure wheel. All hand pressure may now be released as the ring 114 has no disposition to return as lock bar lug 50ª is resting on it and the locking plate is held in disengaged position thereon. The meter is now charged by adjusting the numeral wheels on the "descending" register 100 to show the amount of postage purchased which amount will be shown by the figures at opening z, which in the second case will be 100000 instead of 00 000, which was the reading when the meter was discharged.

The meter described and shown will show a record of the operations of a "postage meter" machine, by registering the exact number of impressions of a die of fixed denomination. The meter could be readily arranged to register the amount in dollars and cents of that type of postage meter machine which prints stamps of varying denominations; the construction of the meter being essentially the same in either case, the difference being that in the former case the numerals at the sight opening will indicate the number of impressions used, as described in my aforesaid patents; and in the latter case the numerals at the sight opening will indicate dollars and cents; and the meter will lock when the whole number of dollars is exhausted, as described in my aforesaid application. In such case the "set back" counter on the meter will always show exactly the number of efficient operations which have been performed by the machine since the last official setting thereof.

In the particular construction shown the "set back counter" only moves one unit for each movement of the die, therefore, the introduction of this feature is applicable only in cases where the ascending and descending registers are geared likewise, that is, designed to count pieces. In the event that it is desired to have the ascending and descending registers read in dollars and cents, it would be necessary to introduce suitable gearing to cause the two counters to move as many points as the value or denomination of the stamp in the die would indicate. Such changes would be readily made by a mechanic so that the meter could be geared up to read in dollars and cents, and at the same time, the "set back counter" be geared direct to the die shaft so that the latter would merely indicate the number of pieces stamped without regard to the value of each impression.

What I claim is:

1. In a meter of the character specified having a meter pin opening; a register and a train of gearing for operating the register once for each operation of the printer when the meter is in position in the related machine; an oscillating shutter lever for opening or closing the meter pin opening; a locking comb adapted to engage and lock the registering mechanism when a predetermined number of operations have been performed; and means whereby when the comb is in unlocking position the shutter lever is held in position to permit the entrance of the meter pin; of a catch adapted to lock the train of gears; a rocking lever and connections for normally holding the catch disengaged; and means whereby the rocking lever is caused to hold the catch in disengaged position when the comb is in unlocking position; said shutter lever and catch being released when the locking comb locks the register.

2. In a meter of the character specified having a meter pin opening; a register and a train of gearing for operating the register once for each operation of the printer when the meter is in position in the related machine; an oscillating shutter lever for opening or closing the meter pin opening; a locking comb adapted to engage and lock the registering mechanism when a predetermined number of operations have been performed; and means whereby when the comb is in unlocking position the shutter lever is held in position to permit the entrance of the meter pin; a catch adapted to engage one of the train of gears to lock the same; a spring for throwing the catch into engaging position; a rocking lever and connections for normally holding the catch disengaged; an arm on said rocking lever engaging the latch lever whereby the rocking lever is caused to hold the catch in disengaged position when the comb is in unlocking position; said shutter lever and catch being released when the locking comb locks the register.

3. In a meter of the character specified having a meter pin opening, a register, a train of gearing for operating the register once for each operation of the printer when the register is in position on the related machine, an oscillating shutter lever for opening or closing the meter pin opening, said lever having a lug and a locking comb adapted to engage and lock the registering mechanism when a predetermined number of operations have been performed, said comb having a lug engaging the lug on the shutter lever whereby when the comb is in unlocking position the shutter lever is held in position to permit the entrance of the meter pin; a catch adapted to engage one of the train of gears to lock the same; a spring for throwing the catch into engaging position; a rocking lever; a link connecting said rocking lever with the catch for normally holding the catch disengaged; said rocking lever having an arm engaging the lug on the shutter, whereby the rocking lever is caused to hold the catch in disengaged position; said locking comb releasing the shutter lever and the rocking lever when the locking comb locks the register.

In testimony that I claim the foregoing as my own, I affix my signature.

ARTHUR H. PITNEY.